United States Patent [19]

Seltzer

[11] Patent Number: 5,326,115
[45] Date of Patent: Jul. 5, 1994

[54] HOMOGENEOUS INTEGRALLY MOLDED SKATE CHASSIS

[75] Inventor: Edwin Seltzer, West Chester, Pa.

[73] Assignee: Roller Derby Skate Corporation, Litchfield, Ill.

[21] Appl. No.: 998,929

[22] Filed: Dec. 30, 1992

[51] Int. Cl.⁵ ............................................. A63C 17/02
[52] U.S. Cl. ................... 280/11.19; 280/11.27; 280/11.28
[58] Field of Search ............... 280/11.19, 11.2, 11.27, 280/11.28

[56] References Cited

U.S. PATENT DOCUMENTS

| | | | |
|---|---|---|---|
| 4,262,918 | 4/1981 | Sandino | 280/11.26 |
| 4,295,655 | 10/1981 | Landay et al. | 280/11.2 |
| 4,398,735 | 8/1983 | Evans et al. | 280/11.28 |
| 4,708,352 | 11/1987 | Vullierme | 280/11.28 |
| 5,143,388 | 9/1992 | Chen | 280/11.28 |

Primary Examiner—Richard M. Camby
Attorney, Agent, or Firm—Sixbey, Friedman, Leedom & Ferguson

[57] ABSTRACT

The skate chassis of the present invention includes a single, homogeneous, integrally molded upper boot and truck assembly which more evenly distributes internal stresses created in the chassis during use. The truck assembly may include a beam extending at an angle from the upper boot to form an axle hub for attaching the wheels. Also, an impact post may be integrally formed with the truck assembly to provide both vertical support and a surface for the rotation of the axle hub and beam. The one piece chassis provides improved handling and maneuverability while simplifying the manufacturing process.

5 Claims, 3 Drawing Sheets

HOMOGENEOUS INTEGRALLY MOLDED SKATE CHASSIS

BACKGROUND

The continued increase in popularity of roller skates has resulted in an increased demand for greater performance from the skates. To achieve greater performance from the roller skate, skate designers and manufacturers continue to search for designs and manufacturing techniques to improve the handling, maneuverability, support, and durability the skate can offer the user.

Conventionally, prior art roller skates have been manufactured by first fabricating a shoe or boot to secure to the foot of the user, and secondly by attaching wheels to the shoe or boot through the use of a wheel hanger or truck assembly. The truck assembly is normally attached to the shoe or boot using screws, bolts, rivets or another similar form of fastener. For example, U.S. Pat. No. 4,262,918 issued to Sandino discloses a roller skate chassis including a foot plate unitarily molded with wheel trucks and wheel axle mounts. The footplate is then attached to a shoe member by threaded screws or rivets. As a result of this two piece construction, the large amount of internal stresses developed in the skate during use are concentrated at the junction between the shoe member or boot and the foot plate or truck assembly. This concentration of stress can lead to gradual separation of the boot from the plate resulting in excessive play or movement between the parts reducing the handling and maneuverability of the skate. Also, the fasteners may fail or rupture causing complete separation and possible injury to the user. Most importantly, because of the practical inability of fasteners to adequately join two separate, non-homogenous parts together as a single integral unit, the lines of force transmitted through the boot during use are not sufficiently distributed throughout the skate to maximize the handling and maneuverability characteristics of the particular skate. Lastly, the manufacturing of the skate disclosed in the Sandino patent necessarily includes a separate additional step of attaching the shoe member to the foot plate.

U.S. Pat. No. 4,295,655 issued to Landay et al. discloses a roller skate including an upper boot adhesively bonded by injection molding to a beam sole or foot plate to which is attached wheel hanger structures. In this design, the internal stress in the skate will be concentrated at the junction between the beam sole and the hanger structures because of the inability of these connections to evenly distribute the lines of force created in the skate. The adhesive connection between the upper boot and the beam sole will be more apt to provide an even force distribution throughout the skate than a connection formed by other fastening techniques. However, since the upper boot is constructed of a different material than the beam sole, the connection is not as effective as a homogeneous, integrally molded junction in distributing forces while minimizing junction stresses. Moreover, the manufacturing process of the skate disclosed in Landay et al. would necessarily involve the steps of attaching both the upper boot and the hanger structures to the beam sole.

The handling and maneuverability of wheeled devices has been improved by the use of a truck assembly having a deflection beam extending at an angle from an upper support plate to form an axle hub for supporting the wheels. As disclosed in U.S. Pat. No. 4,398,735 to Evans et al., the deflection beam, combined with a impact post for creating a pivot point for rotation of the axle hub, provides a very stable support system with minimal wobble at high speeds and a high degree of maneuverability. However, since the deflection beam is fastened to an upper board, a high concentration of stress will be developed in the junction between the beam and the board causing an uneven distribution of forces in the truck assembly. Also, pivoted lateral movement of a user's foot, ankle and leg is not effectively transmitted to the truck assembly since no shoe or boot is attached to the upper board. Consequently, the maneuverability and handling potential of the skate is not maximized and the benefits obtained by the deflection beam can not be fully appreciated.

SUMMARY OF THE INVENTION

It is one object of the present invention to provide an improved skate chassis which can provide stable support for a user's foot while offering increased handling, maneuverability and durability.

Another object of the present invention is to provide a novel and improved skate chassis which can be simply and efficiently manufactured as a single, homogeneous, integrally molded piece thereby simplifying the manufacturing process by minimizing the number of assembly steps.

Yet another object of the present invention is to provide a novel and improved skate chassis for a roller skate which effectively and evenly distributes internal stresses developed in the chassis during use to provide improved skating performance and skate durability.

A further object of the present invention is to provide a novel and improved roller skate which more effectively directs and focuses the steering forces created in the skate by the user during maneuvering to provide better control and handling through a broader range of maneuvers.

These and other objects of the present invention are achieved by forming a single, homogeneous skate chassis having an integrally molded upper boot and truck assembly. The upper boot includes a base portion and side walls extending from one side of the base portion to provide lateral support to the user's foot and ankle while the truck assembly extends from a second side of the base portion to provide an attachment means for attaching the wheels. The truck assembly includes a deflection beam extending at an acute angle from the second side of the base portion to form an axle hub. The truck assembly may also include an impact post for each axle hub extending substantially perpendicular from the base portion adjacent the axle hub to provide both vertical support and a pivot point for the axle hub. A brake mount may also be integrally formed on the truck assembly.

BEST MODE FOR CARRYING OUT THE INVENTION

Throughout this specification, the words "downward" and "downwardly", "upward" and "upwardly" will correspond to the directions, respectively, toward and away from the surface on which the roller skate is placed in the normal upright position. The words "lower" and "upper" will refer to the portions of the skate chassis which are, respectively, closest to and farthest away from the surface on which the roller skate rests when placed in the normal upright position.

Figure 1:
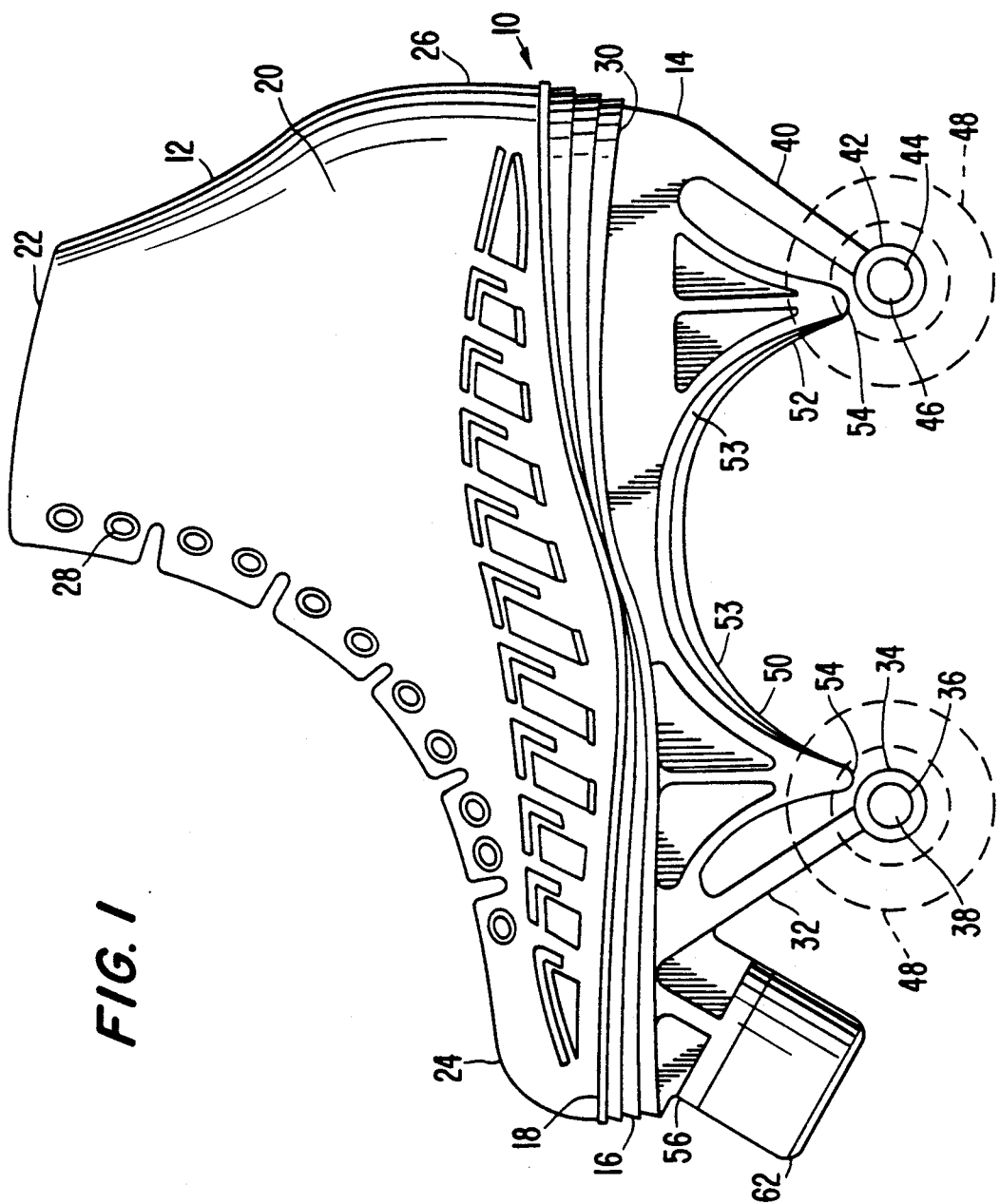
FIG. 1 is a side elevation of a skate chassis in accordance with the present invention.

Referring to FIG. 1, the novel roller skate chassis of the present invention indicated generally at 10 includes an upper boot 12 and a truck assembly 14. Upper boot 12 and truck assembly 14 are molded as a single, homogeneous, integral piece to form skate chassis 10. Therefore, in practical form, upper boot 12 and truck assembly 14 are not distinct separate parts connected together by some form of fastener but are identifiable portions of the single, homogeneous integrally molded skate chassis of the present invention. Since the skate chassis is subjected to a variety of forces and stresses during skating, the material used to form skate chassis 10 should be a high impact resistant plastic commonly used in the formation of roller skates, such as a nylon material or polypropylene. These materials provide the durability and resiliency necessary for the effective performance of the skate. Also, these materials allow the skate to be manufactured using injection molding.

Figure 2:
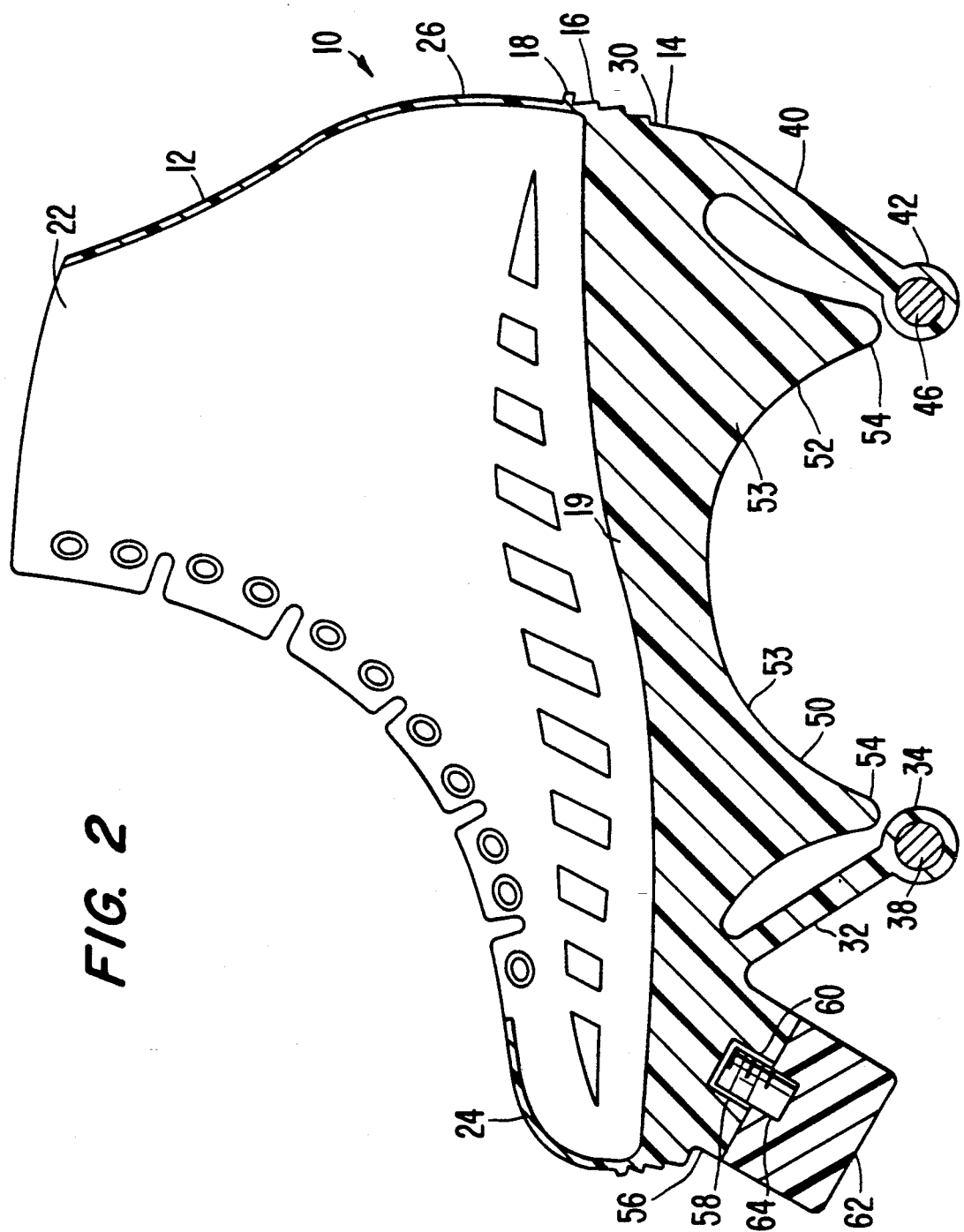
FIG. 2 is a side cross sectional view of the skate chassis of the skate chassis of FIG. 1 taken along line 2—2 in FIG. 3.

As shown in FIGS. 1 and 2, upper boot 12 includes a base portion 16 having a generally flat, horizontal top side or surface 18 with an outer peripheral shape corresponding to the shape of a user's foot. Since base portion 16 provides vertical support for the user's foot, top side 18 may be shaped to conform to the bottom surface of the user's foot, such as the arch area 19.

Upper boot 12 includes side wall portions 20 which extend upwardly from top side 18 of base portion 16. Side wall portions 20 form a cavity 22 for receiving a user's foot. A liner or sock may be attached to the interior of cavity 22 to allow side wall portions 20 to securely support the user's foot while providing a cushioning effect. Upper boot 12 also includes a toe portion 24 positioned at one end of base portion 16 and a heel portion 26 formed at an opposite end of base portion 16. Toe portion 24 and heel portion 26 are spaced longitudinally along base portion 16 an appropriate distance corresponding to the length of a particular user's foot so as to snugly, but comfortably, receive the user's foot in cavity 22. A plurality of apertures 28 may be formed inside wall portions 20 for receiving boot or shoe laces (not shown) to secure a user's foot in cavity 22. Alternatively, any other commonly used fastener for securing a person's foot in a shoe or boot could be employed.

Truck assembly 14 includes and extends downwardly from the top side surface 18 of base portion 16. Truck assembly 14 includes a forward beam 32 extending downwardly at an acute angle from bottom side 30 toward the rear of chassis 10. An axle hub 34 is integrally formed on the lower end of forward beam 32. Axle hub 34 includes a center bore 36 extending transversely therethrough for attaching an axle 38 to forward beam 32. Also, a rear beam 40 extends downwardly from bottom side 30 opposite heel portion 26 toward forward beam 32 at an acute angle from base portion 16. Similarly, an axle hub 42 having a center bore 44 is integrally formed on the lower end of rear beam 40. Both center bores 36, 44 are sized to receive axles 38, 46, respectively, which extend transversely outward from axle hubs 34, 42 on both sides of chassis 10 to receive wheels 48. Therefore, one wheel is rotatably connected on each side of each axle hub 34 and 42 using axles 38 and 46, respectively, as oriented on a conventional roller skate.

Figure 3:
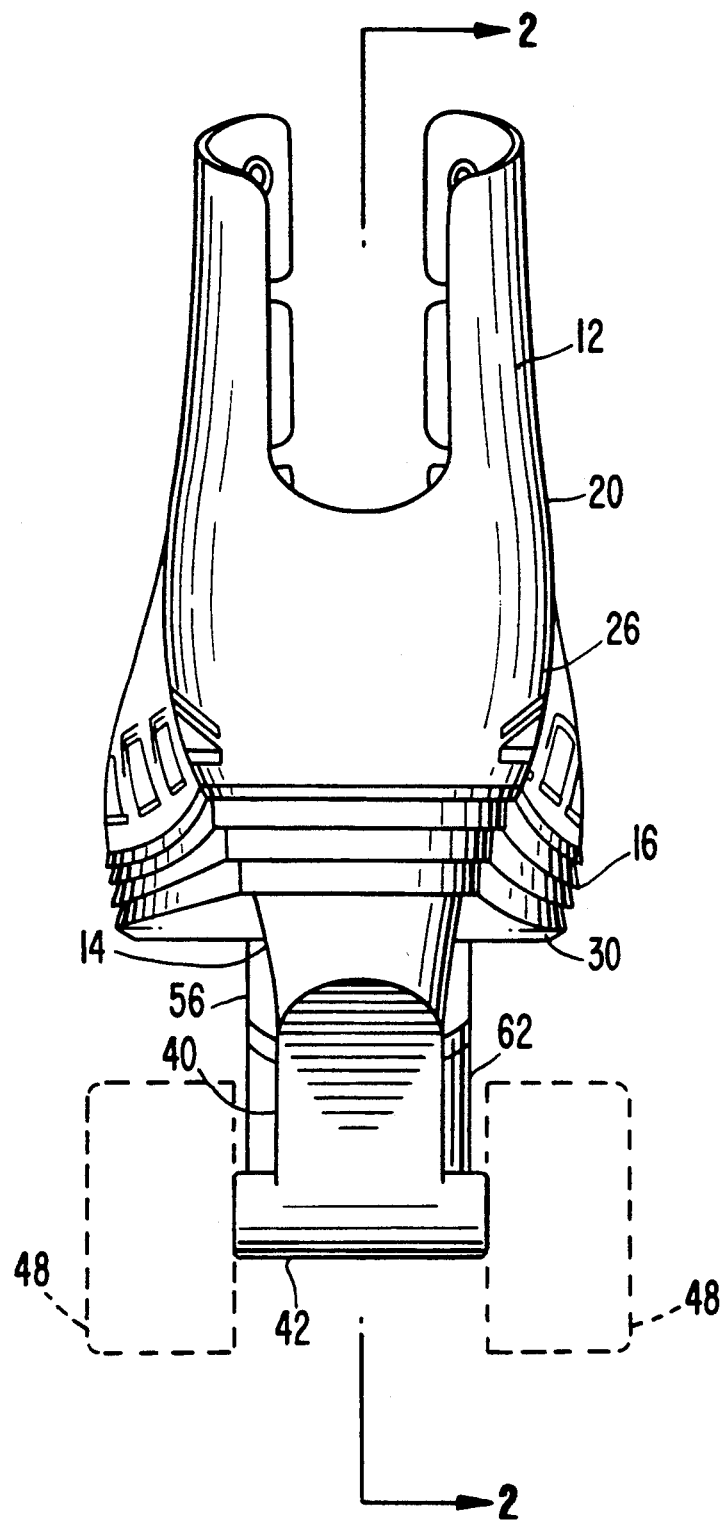
FIG. 3 is a rear elevation of the skate chassis shown in FIG. 1.

Both forward beam 32 and rear beam 40 are generally rectangular in shape. As contrasted in FIGS. 1 and 3, the transverse width of beams 32, 40 is substantially greater than the thickness thereof. These dimensions allow beams 32, 40 to deflect upwardly toward base portion 16 and to twist or rotate, as further described herein below.

Truck assembly 14 also includes a forward impact post 50 and a rear impact post 52 integrally formed with upper boot 12. Forward impact post 50 extends downwardly from bottom side 30 toward axle hub 34. Similarly, rear impact post 52 extends downwardly from bottom side 30 of base portion 16 toward axle hub 42. As shown in FIGS. 1 and 2, forward impact post 50 and rear impact post 52 include a long, upper base portion 53 integrally formed with base portion 16 of upper boot 12 and a shorter lower end 54 terminating at a spaced distance from axial hubs 34, 42. Upper base portions 53 are longer, relative to the longitudinal axis of base portion 16, than lower ends 54 to provide substantial support for lower ends 54 and, in turn, beams 32, 40 during use. Forward impact post 50 and rear impact post 52 generally extend from the central longitudinal axis of the chassis 10 thereby evenly distributing the weight of the user to each of the four wheels 48, as can be appreciated from FIG. 3.

A brake mount 56 may also be integrally formed with chassis 10. As shown in FIGS. 1 and 2, brake mount 56 is positioned forward of forward beam 32 and extends downwardly from bottom side 30 opposite toe portion 24. Brake mount 56 includes a recess 58 for securely receiving a threaded insert 60. In this manner, a toe stop 62, having a threaded stud 64, can be securely attached to brake mount 56 by screwing stud 64 into insert 60.

During use, forward beam 32 and rear beam 40 deflect inwardly toward bottom side 30 into abutment with forward impact post 50 and rear impact post 52, respectively. Impact posts 50, 52 both function to prevent beams 32, 40 from deflecting by an amount which would cause the beam material to lose its structural integrity. In addition, lower ends 54 of impact posts 50, 52 provide surfaces for supporting the torsional rotation of beams 32, 40. Therefore, when the user leans on one side of base portion 16, in an effort to turn during skating, a force is applied to the wheels on that particular side of the skate causing axle hubs 34, 42 to rotate transversely around lower ends 54 causing the torsional rotation of beams 32, 40 thereby assisting the skater in completing the turn. The ability of beams 32, 40 to flex or torsionally rotate is related to the force necessary to turn during skating. The more resistant beams 32, 40 are to rotation, the greater the force required to turn during skating. One manner of controlling the turning ability of the skate by varying the torsional resistance of the beams 32, 40 is to vary the thickness of beams 32, 40. Increasing the thickness of beams 32, 40 will result in more resistance to torsional rotation requiring the same user to apply a greater force to turn. Alternatively, lower ends 54 can be shaped to vary the contact surface area thereby varying the resistance to the rotation of beams 32, 40.

As best shown in FIG. 2, upper boot 12 and truck assembly 14, including brake mount 56, forward beam 32, rear beam 40, impact posts 50, 52 and axle hubs 34, 42, are all integrally molded into a single homogeneous skate chassis 10. During use, with the roller skate securely attached to a user's foot, a variety of forces are imparted to the skate chassis by both the user's body weight and the pushing and twisting loads applied by the user during skating and turning. In the conventional skate where two or more parts are fastened together to form the skate chassis, these forces become unevenly distributed at the junction between the connected parts. This uneven distribution of forces impairs the handling and maneuverability of the skate.

Also, the forces imparted to the skate create internal stresses in the chassis. In the conventional roller skate, these internal stresses are concentrated at the junction between the connected parts. This concentration of stress may cause the fasteners to fail or rupture resulting in the complete separation of the parts and possible injury to the user. Also, this uneven distribution of internal stresses can lead to the gradual separation of the boot from the conventional base plate positioned between the boot and the truck assembly resulting in excessive play or movement between the parts reducing the handling and maneuverability of the skate.

The roller skate of the present invention overcomes these disadvantages by using a single, homogeneous, integrally molded, skate chassis. By molding the upper boot 12 and truck assembly 14 into a single homogenous skate chassis 10, the forces and internal stresses developed in the chassis during use, are more evenly distributed throughout the chassis to provide improved handling, maneuverability and durability throughout the life of the roller skate. Since the integrally molded, homogenous skate chassis 10 avoids the need for a separate base plate and includes no junctures where two parts are connected, the internal stresses do not become concentrated in such juncture areas and, therefore, are more evenly distributed throughout chassis 10 avoiding the disadvantages discussed above. For example, any lateral force applied to side wall portions 20 will be transmitted directly to truck assembly 14 without becoming unduly concentrated at one particular location. The integrally molded, homogenous nature of the skate chassis 10 causes the turning forces developed during skating to be more effectively transmitted through the chassis to beams 32, 40 and axle hubs 34, 42. In this manner, the improved force distribution qualities of the integrally molded, homogeneous skate chassis 10 enhances the maneuverability qualities of the deflection beams 32, 40 to improve the overall handling and durability of the roller skate. In addition, since the skate chassis 10 is a one-piece member, it contains no parts which require adjustment or readjustment throughout the usable life of the skate. Also, the one-piece integrally molded chassis reduces the number of parts required to complete the roller skate and, therefore, minimizes the number of assembly steps, time and labor required to assemble the roller skate.

I claim:

1. A plastic roller skate chassis molded of a single, homogeneous integrally molded piece comprising
a boot portion for receiving a skater's foot having a molded outer shell including a toe portion, a heel portion spaced from said toe portion and sidewall portions extending longitudinally from said toe to said heel portion,
and a truck assembly molded integrally with said boot portion and including a single, unitary base portion extending between said sidewall portions and said heel and toe portions, said base portion including a bottom side and a top side surface which forms the bottom foot support for said skater's foot and with said heel, toe and sidewall portions defines a cavity within said molded outer shell for receiving a skater's foot which is supported and enclosed thereby, and wheel attachment means molded integrally with said base portion and extending from the bottom side of said base portion, said boot portion and truck assembly being formed as a single unitary piece with no junctures therebetween
wherein said wheel attachment means includes a first beam extending at an acute angle outwardly from the bottom side of said base portion in an area beneath the toe portion of said molded outer shell, said first beam angling toward the heel portion of said molded outershell and including a free end, first axle hub means formed at said free end of said first beam to receive and support a roller skate wheel axle, and a second beam extending at an acute angle outwardly from the bottom side of said base portion in an area beneath the heel portion of said molded outer shell, said second beam angling toward the toe portion of said molded outer shell and including a free end, second axle hub means formed at said free end of said second beam to receive and support a roller skate wheel axle, said first and second beams being configured to flex toward the bottom side of said base portion, and first and second spaced impact posts positioned between said first and second beams and extending adjacent thereto from the bottom side of said base portion, said first and second impact posts each having a free end to contact the first and second axle hub means respectively and being rigid to support the torsional rotation of said first and second beams, the free ends of said first and second impact posts having surfaces for supporting the torsional rotation of the first and second beams respectively.

2. The plastic roller skate chassis of claim 1 wherein said molded outer shell heel, toe and sidewall portions are molded to have a reduced, thin cross sectional area relative to the cross sectional area of said truck assembly, and said top side surface of said base portion includes an arch area and is curved to substantially conform to the bottom of a user's foot.

3. The plastic roller skate chassis of claim 1 wherein said boot portion and truck assembly are a single unitary piece with no separate moving parts molded of a single plastic material.

4. The plastic roller skate chassis of claim 3 wherein said single plastic material is a high impact resistant plastic.

5. The plastic roller skate chassis of claim 4 wherein said boot portion and truck assembly are molded from polypropylene.

* * * * *